Nov. 5, 1940.          V. A. SODERBERG                2,220,429
              GLARE SHIELD FOR AUTOMOBILES, BUSES, ETC.
                       Filed Feb. 26, 1940
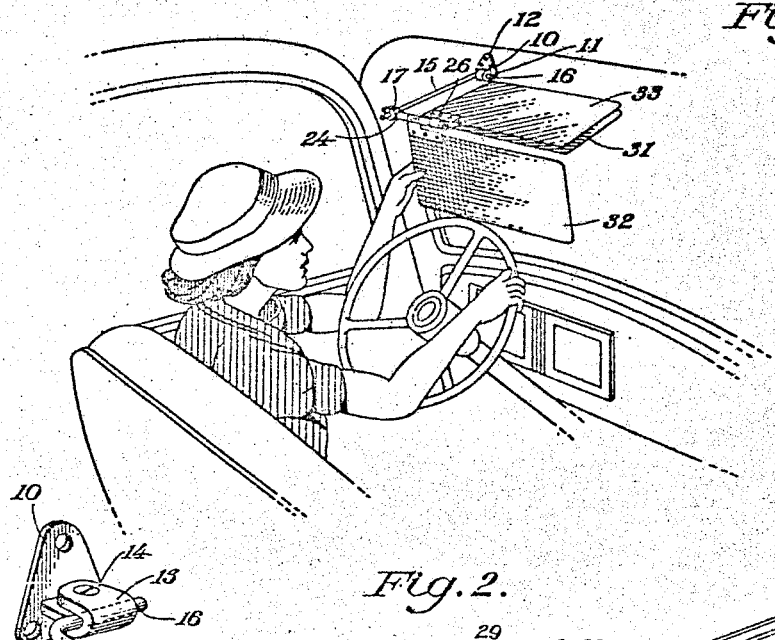
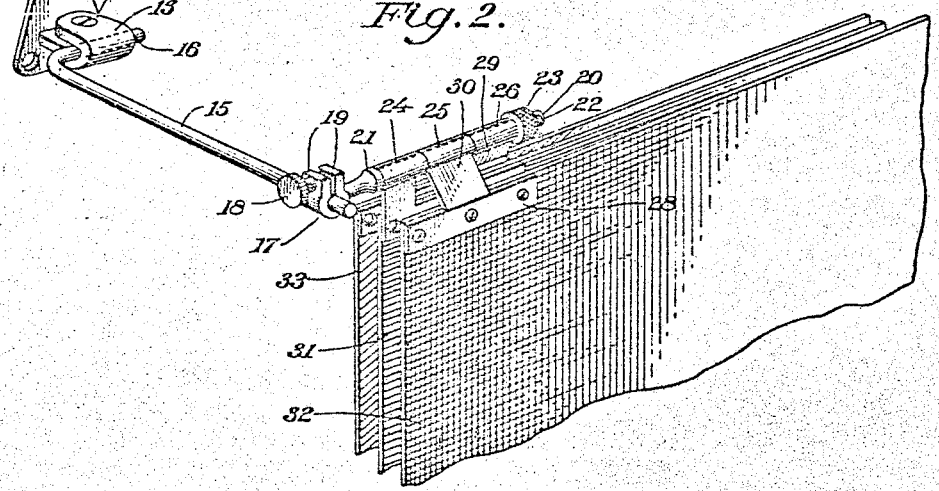
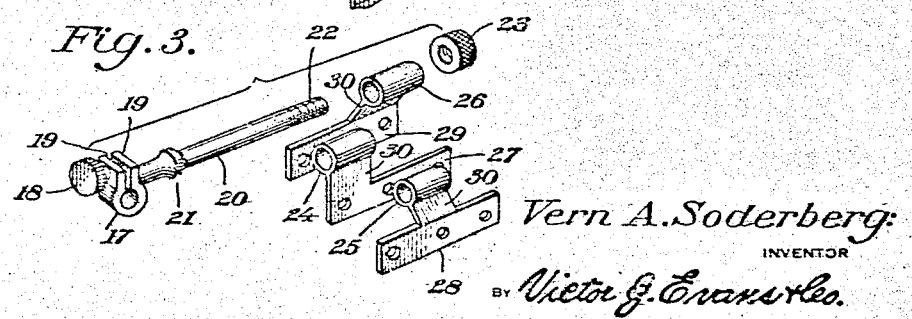
Vern A. Soderberg,
INVENTOR
BY Victor J. Evans & Co.
ATTORNEYS Patented Nov. 5, 1940

2,220,429

UNITED STATES PATENT OFFICE 2,220,429

GLARE SHIELD FOR AUTOMOBILES, BUSES, ETC.

Vern August Soderberg, Boone, Iowa

Application February 26, 1940, Serial No. 320,912

1 Claim. (Cl. 296—97)

This invention relates to a glare shield for automobiles, buses, etc., and has for an object to provide a glare shield formed of a plurality of distinctively tinted transparent panels adapted to filter light rays to remove glare from approaching headlights, the panels each being heavily shaded at the left and gradually fading out toward the right to effectively filter approaching vehicles' lights as they draw close to the driver and thereby relieve strain on the eyes.

A further object is to provide a glare shield of this type which may be easily and quickly adjusted to move the panels respectively or as a unit, or in any desired combination to operative position in front of the driver's eyes.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming a part of this specification:

Figure 1 is perspective view of a glare shield, constructed in accordance with the invention, in applied position.

Figure 2 is a fragmentary perspective view of the glare shield shown in Figure 1.

Figure 3 is a perspective view of the clamp and shaft of the glare shield, the parts being separated from each other for the purpose of clearness.

Referring now to the drawing in which like characters of reference designate similar parts in the various views, a glare shield is shown to comprise a bracket having an attaching plate 10 adapted to be secured to the frame 11 of the windshield above the glass by screws 12, or other connectors. The bracket is provided with a bearing 13 of substantially U-shaped longitudinal section having one leg formed integral with the plate 10 and having the other leg disposed parallel with the first named leg, a screw 14 being passed through both legs to tighten the bearing or loosen the bearing as desired.

An arm 15 is provided at one end with a shaft 16 which is received in the bearing 13 and forms a horizontal axis for rotation of the arm. A split ring clamp 17 is sleeved on the arm 15 and a set screw 18 is passed through the parallel legs 19 of the clamp to tighten and loosen the clamp on the arm 15. The set screw 18 may be manipulated to adjust the clamp lengthwise of the arm 15. A shaft 20 is formed integral with one of the legs 19 of the clamp 17. The clamp is provided with a shoulder 21 near the clamp and the free end is threaded as shown at 22 to receive a nut 23.

A plurality of tubular bearings, in this case three, 24, 25, and 26, are sleeved frictionally upon the shaft 20. The bearings have depending therefrom respective crank arms equipped terminally with attaching plates 27, 28, and 29. The crank arms designated in general by the numeral 30 are inclined at such angles to their respective tubular bearings that the attaching plates may be spaced slightly from each other and parallel with each other when the tubular bearings are disposed end to end on the shaft 20.

The attaching plates are provided with respective transparent distinctly colored panels 31, 32, and 33. Preferably the rearmost panel 33, that is the panel closest to the windshield is tinted amber, the intermediate panel 31 is tinted blue, and the panel 32 next to the driver is tinted black. Each panel is heavily shaded to the left and gradually fades out to the right.

In operation any desired panel or any combination of the panels as a unit may be rocked from a horizontal position in the plane of the arm 15 to a vertical position, about the shaft 20 as a horizontal axis, to shield the driver's eyes from light rays emanating from approaching vehicle headlights.

From the above description it is thought that the construction and operation of the invention will be fully understood without further explanation.

What is claimed is:

A glare shield comprising a bracket adapted to be secured adjacent the windshield of a motor vehicle, an arm pivotally secured at one end to the bracket for swinging movement about a horizontal axis, a clamp mounted on the arm for adjusting in the direction of the length of the arm, a shaft carried by the clamp adapted to extend parallel to the windshield, a plurality of tubular bearings frictionally sleeved on the shaft end to end, respective crank arms depending from the bearings, attaching plates carried by the crank arms, the crank arms being disposed at such angles that the attaching plates are disposed parallel and in spaced relation to each other, and respective transparent distinctively colored panels carried by the attaching plates and adapted to be moved from horizontal inoperative position to vertical operative position.

VERN A. SODERBERG.